(12) United States Patent
He et al.

(10) Patent No.: US 12,474,614 B2
(45) Date of Patent: Nov. 18, 2025

(54) ELECTROCHROMIC DEVICE

(71) Applicant: SHENZHEN GUANGYI TECH CO., LTD., Shenzhen (CN)

(72) Inventors: Jiazhi He, Shenzhen (CN); Guoyang Hu, Shenzhen (CN); Yanhang Lu, Shenzhen (CN)

(73) Assignee: SHENZHEN GUANGYI TECH CO., LTD., Shenzhen (CN)

( * ) Notice: Subject to any disclaimer, the term of this patent is extended or adjusted under 35 U.S.C. 154(b) by 335 days.

(21) Appl. No.: 18/207,310

(22) Filed: Jun. 8, 2023

(65) Prior Publication Data
US 2023/0314894 A1 Oct. 5, 2023

Related U.S. Application Data

(63) Continuation of application No. PCT/CN2021/135902, filed on Dec. 7, 2021.

(51) Int. Cl.
*G02F 1/153* (2006.01)
*G02F 1/161* (2006.01)

(52) U.S. Cl.
CPC ............ *G02F 1/1533* (2013.01); *G02F 1/161* (2013.01); *G02F 2001/1536* (2013.01)

(58) Field of Classification Search
CPC .................. G02F 1/1533; G02F 1/161; G02F 2001/1536; G02F 2001/1502; G02F 1/153
See application file for complete search history.

(56) References Cited

U.S. PATENT DOCUMENTS 4,773,741 A 9/1988 Inaba
5,216,536 A * 6/1993 Agrawal ............... G02F 1/1533
359/272

(Continued)

FOREIGN PATENT DOCUMENTS

CN 206653715 U 11/2017
CN 110838262 A 2/2020
(Continued)

OTHER PUBLICATIONS

International Search Report for corresponding application PCT/CN2021/135902 filed Dec. 7, 2021; Mail date Mar. 8, 2022.

*Primary Examiner* — Mariam Qureshi
(74) *Attorney, Agent, or Firm* — CANTOR COLBURN LLP

(57) ABSTRACT

The present application provides an electrochromic device, which comprises a first substrate layer, a first conductive layer, a solid-state color changing layer, a second conductive layer and a second substrate layer which are stacked in sequence. A varnish layer is disposed at an edge region of the first conductive layer and/or an edge region of the second conductive layer. The Dyne value of the varnish layer minus the surface tension of a slurry of a structure layer in the solid-state color changing layer which is in contact with the first conductive layer or the second conductive layer is less than or equal to 5 mN/m. Since the varnish layer is arranged, when the solid-state color changing layer is coated, the slurry of the solid-state color changing layer cannot be attached to the varnish surface. Therefore, wiping is not required, and a number of problems caused by wiping are avoided. Otherwise, the adhesion of the solid-state color changing layer to the varnish surface is reduced. Moreover, the arrangement of the varnish defines the boundary of wiping and ensures the progress of wiping.

20 Claims, 3 Drawing Sheets

(56) References Cited

U.S. PATENT DOCUMENTS

| | | | |
|---|---|---|---|
| 10,061,117 B1 | 8/2018 | Langendijk | |
| 2007/0128905 A1* | 6/2007 | Speakman | H10F 77/244 |
| | | | 257/E31.126 |
| 2011/0249314 A1 | 10/2011 | Wang | |

FOREIGN PATENT DOCUMENTS

| | | |
|---|---|---|
| CN | 110901540 A | 3/2020 |
| CN | 111128024 A | 5/2020 |
| CN | 111443545 A | 7/2020 |
| CN | 111897172 A | 11/2020 |
| CN | 214669989 U | 11/2021 |
| KR | 20150117475 A | 10/2015 |

* cited by examiner

ELECTROCHROMIC DEVICE

CROSS-REFERENCE TO RELATED APPLICATION(S)

This is a continuation application of International Patent Application No. PCT/CN2021/135902, filed on Dec. 7, 2021, which is based on and claims priority to Chinese Patent Application No. 202011490980X filed on Dec. 16, 2020, the disclosures of which are incorporated herein by reference in their entireties.

TECHNICAL FIELD

The present application belongs to the technical field of electrochromism, and relates to an electrochromic device.

BACKGROUND

The optical properties of electrochromic devices allows for stable and reversible color changes in response to an applied electric field, which has been widely used in the automotive, architectural, and consumer electronics fields.

In the prior art, the silver paste bus bar is generally pre-arranged on the ITO by screen printing on the conductive layer, then the electrochromic layer and ion storage layer are coated on the conductive layer with the screen printed silver paste, and at this point the electrochromic layer or ion storage layer at the edge of the ITO needs to be removed by wiping and then combined to form the electrochromic device. After that, on the periphery side of the electrochromic device, a seal is provided on the surface from which the electrochromic layer or ion storage layer is removed, so as to protect the material inside the electrochromic device from water and oxygen. If the combination is directly carried out without wiping, the seal will be bonded to the electrochromic layer or ion storage layer. The electrochromic layer or ion storage layer has poor mechanical structure and can crack easily, resulting in the seal peeling off easily. Thereby, the moisture is prone to entering the device interior from where the seal peels off, thus damaging the device.

However, there are many problems with wiping. (1) The problem of wiping difficulty: for guaranteeing the stability of the electrochromic film, a certain bonding force between the electrochromic layer/ion storage layer and ITO is required; however, the greater the bonding force, the greater the wiping difficulty, and for example, the electrochromic layer/ion storage layer in the prior art is generally difficult to wipe off; besides, the time consumed by wiping is also increased and the productivity is reduced. (2) The problem of wiping accuracy: in the prior art, the flexible substrate (for example, PET) is generally wiped manually, so it is difficult to ensure that the boundary between wiping region and non-wiping region is straight and uniform, and there is a serious problem of wiping accuracy.

Therefore, it is expected to provide a method that can solve the problems of wiping and yet ensure a good moisture barrier effect in the art.

SUMMARY

The present application provides an electrochromic device, which requires no wiping step or reduces the difficulty of wiping, and has good moisture barrier effect.

In an aspect, the present application provides an electrochromic device, and the electrochromic device includes a first substrate layer, a first conductive layer, a solid color-changing layer, a second conductive layer and a second substrate layer stacked in sequence;

a varnish layer is arranged at an edge region of the first conductive layer and/or at an edge region of the second conductive layer, and a dyne value of the varnish layer minus a surface tension of a slurry of a structure layer in the solid color-changing layer is less than or equal to 5 mN/m (such as 5 mN/m, 4.5 mN/m, 4 mN/m, 3 mN/m, 2 mN/m, 1 mN/m, 0 mN/m, −1 mN/m, −2 mN/m, −3 mN/m, etc.), in which the structure layer contacts with the first conductive layer or the second conductive layer.

In the present application, the structural layer, which contacts with the first conductive layer or the second conductive layer, in the solid color-changing layer mainly refers to the ion storage layer or the electrochromic layer in the solid color-changing layer. The slurry of the electrochromic layer is in a mixed form in which a material of the electrochromic layer is dispersed in a solvent; the slurry of the ion storage layer is in a mixed form in which a material of the ion storage layer is dispersed in a solvent.

In the present application, a material of the varnish layer includes, for example, an epoxy acrylate resin, a polyurethane acrylate resin, a polyester acrylate resin, and a mixture thereof.

A material of the electrochromic layer includes but not limited to, for example, tungsten trioxide, poly(decylviologen) and its derivatives, polyaniline and its derivatives, an electrochromic conjugated polymer or an acceptor-containing copolymer. The electrochromic conjugated polymer includes one or a combination of at least two of polypyrrole and its derivatives, polythiophene and its derivatives, poly(3,4-ethylenedioxythiophene) and its derivatives, poly(propylenedioxythiophene) and its derivatives, polyfuran and its derivatives, polyfluorene and its derivatives, polycarbazole and its derivatives, and a copolymer thereof. The acceptor-containing copolymer includes one or a combination of at least two of benzothiadiazole, benzoselenadiazole, benzoxazole, benzotriazole, benzimidazole, quinoxaline, and diketopyrrolopyrrole.

A solvent to dispersing the material of the electrochromic layer includes but not limited to, for example, ethanol, isopropyl alcohol, xylene, toluene, ethyl acetate, acetic acid, acetone, etc. and a mixture thereof.

A material of the ion storage layer includes, for example, one or a combination of at least two of metal oxides or metal complexes formed from an metal element in Group IIIB, Group IVB, Group VB, Group VIB, Group VIIB, Group VIII, Group IB and Group IIB, which can store ions during the electrochemical reaction; preferably, the metal element is selected from Ti, V, Nb, Ta, Cr, Mo, W, Mn, Fe, Co, Ir, Ni, Cu and Zn; preferably, the complex is selected from one or a combination of at least two of Prussian green, Prussian white, Prussian brown, Prussian blue, $KFeFe(CN)_6$, FeNiHCF, FeHCF, NiHCF or $X_mY_n\{Fe(CN)_6\}$, wherein X is $Na^+$ or $K^+$, and Y is $Fe^{3+}$, $Co^{3+}$, $Ni^+$, $Mn^{2+}$, $Zn^{2+}$ or $Cu^{2+}$.

A solvent to dispersing the material of the ion storage layer includes but not limited to, for example, ethanol, isopropyl alcohol, xylene, toluene, ethyl acetate, acetic acid, acetone, etc. and a mixture thereof.

The surface tension of the slurry of the electrochromic layer or the ion storage layer can be adjusted by adjusting the type of solvent, changing the solid content of the electrochromic layer/ion storage layer, adding silica nanoparticles and other means known to those skilled in the art, which will not be elaborated here in the present application.

In the present application, by arranging the varnish layer (which is a solid structural layer) at the edge regions of the first conductive layer and the second conductive layer, and by controlling the difference obtained from subtracting the surface tension of the slurry of the structure layer in the solid color-changing layer, which contacts with the first conductive layer or the second conductive layer, from the dyne value of the varnish layer to be less than or equal to 5 mN/m, due to the surface tension, the slurry of the solid color-changing layer will not adhere to the varnish surface when the solid color-changing layer is coated, and thus the wiping step is skipped directly, avoiding a series of problems brought by wiping; or the adhesion of the solid color-changing layer on the varnish surface is reduced, and at the same time, the boundary of the wiping region is defined by varnish arrangement, guaranteeing the accuracy of wiping.

Preferably, the edge region is a region with a distance from the outer edge of the first conductive layer or the outer edge of the second conductive layer being less than 10 mm, and for example, a region with a distance, such as 9 mm, 8 mm, 7 mm, 6 mm, 5 mm, 4 mm, 3 mm, 2 mm or 1 mm, from the outer edge of the first conductive layer or the outer edge of the second conductive layer.

Preferably, a dyne value of the varnish minus a surface tension of a slurry of a structure layer in the solid color-changing layer is less than or equal to 0 mN/m, in which the structure layer contacts with the first conductive layer or the second conductive layer.

Preferably, a contact angle θ between a slurry of a structure layer in the solid color-changing layer and the varnish layer is more than or equal to 30°, such as 30°, 35°, 38°, 40°, 45°, 50°, 55°, etc., in which the structure layer contacts with the first conductive layer or the second conductive layer. Preferably, a contact angle θ between a slurry of a structure layer in the solid color-changing layer and the varnish layer is more than or equal to 40°, in which the structure layer contacts with the first conductive layer or the second conductive layer. When the θ is more than or equal to 30°, the slurry (for example, EC (electrochromic layer slurry) and/or CE (ion storage layer slurry)) of the structural layer in the solid color-changing layer, which contacts with the first conductive layer or the second conductive layer, can partially cover the varnish when being coated, but the coating bonding is not good and the wiping is not difficult; when the θ is more than or equal to 40°, the slurry (for example, EC and/or CE) of the structural layer in the solid color-changing layer, which contacts with the first conductive layer or the second conductive layer, just slightly covers a small part of the varnish layer or cannot be coated on the varnish layer at all, so that the slurry can be removed easily or even no wiping step is required.

Preferably, conductive lines are arranged on the first conductive layer and the second conductive layer.

Preferably, a width of the varnish layer is more than or equal to a width of the conductive lines, and a thickness of the varnish layer is 1 μm-10 μm; (such as 1 μm, 2 μm, 3 μm, 4 μm, 5 μm, 6 μm, 7 μm, 8 μm, 9 μm or 10 μm). In the present application, if the thickness of the varnish layer is too large, the coating effect of the solid color-changing layer will be affected during device preparation, and the electrochromic layer or the ion storage layer is unable to completely cover the edge of the varnish layer close to the electrochromic layer or the ion storage layer, resulting in the absence of the electrochromic layer or the ion storage layer at that edge.

In the present application, a width of the varnish layer is the distance arranged along the length of the first conductive layer or the second conductive layer.

Preferably, a thickness of the conductive lines is 1 nm-10 μm (such as 1 nm, 3 nm, 5 nm, 10 nm, 30 nm, 50 nm, 100 nm, 300 nm, 500 nm, 800 nm, 1 μm, 2 μm, 3 μm, 4 μm, 5 μm, 6 μm, 7 μm, 8 μm, 9 μm, or 10 μm).

The substrate layer can be a transparent substrate and is an optical grade transparent material, and specifically, a flexible substrate material, including polyester film (Polyester Film, PET), cyclic olefin copolymer or cellulose triacetate, etc.

A material of the conductive layer may be selected from indium-tin oxide (indium-tin oxide, ITO), aluminum zinc oxide (aluminum zinc oxide, AZO), fluorine doped tin oxide (fluorine doped tin oxide, FTO), silver nanowires, graphene, carbon nanotubes, metal mesh, silver nanoparticles, or other conductive materials.

Preferably, a material of the conductive line may be selected from any one or a combination of at least two of conductive silver paste, conductive copper paste, conductive carbon paste, nano-silver conductive ink, copper foil, copper wire, or conductive film and other conductive materials; the conductive line can also use the same material of the conductive layer, and the material at the conductive line has greater thickness and smaller resistance, so that while the conductive function is guaranteed, the product visual continuity can be increased because the material is transparent.

Preferably, the solid color-changing layer includes an ion storage layer, an ion transfer layer and an electrochromic layer stacked in sequence, the ion storage layer contacts with the first conductive layer, and the electrochromic layer contacts with the second conductive layer.

Preferably, a first varnish layer and a second varnish layer are arranged at the edge region of the first conductive layer and the edge region of the second conductive layer, respectively, the first varnish layer contacts with the ion storage layer, and the second varnish layer contacts with the electrochromic layer.

Preferably, a surface tension of the slurry of the ion storage layer or the electrochromic layer is 15-32 mN/m, such as 15 mN/m, 18 mN/m, 20 mN/m, 22 mN/m, 23 mN/m, 24 mN/m, 25 mN/m, 26 mN/m, 26.5 mN/m, 27 mN/m, 28 mN/m, 29 mN/m, 30 mN/m, 31 mN/m or 32 mN/m. Preferably, a surface tension of the slurry of the ion storage layer or the electrochromic layer is 20-32 mN/m.

Preferably, the first varnish layer and the conductive line on the first conductive layer are arranged side by side with direct contacting, the second varnish layer and the conductive line on the second conductive layer are arranged side by side with direct contacting, the first varnish layer and the second varnish layer are aligned to an edge of the first conductive layer and an edge of the second conductive layer, respectively.

In the present application, in the case where a gap exists between the conductive line and the varnish layer, the gap region can change color, while the varnish region and the conductive line region, on two sides of the gap region, cannot change color. Therefore, during the color-changing process, the color change of the gap region will be very abrupt. In order to reduce this abrupt visual result, the conductive line and the varnish can be arranged to directly contact each other.

Preferably, the first varnish layer and the second varnish layer cover the conductive line on the first conductive layer and the conductive line on the second conductive layer, respectively, and the first varnish layer and the second varnish layer are aligned to an edge of the first conductive layer and an edge of the second conductive layer, respectively.

In the case where the sealing adhesive has the equal width, by arranging the varnish layer on the conductive line, the area that cannot change color is reduced, or in other words, the visible area is increased. Meanwhile, the varnish layer can also protect the conductive line from being corroded.

In the present application, a width d of the varnish layer is less than 25 mm to ensure maximum color-change area.

Preferably, the electrochromic device further includes a seal arranged on the periphery side of the electrochromic device.

Preferably, the seal is a sealing adhesive structure.

In the present application, the sealing adhesive has a good bonding effect with the varnish layer so as to ensure an effective sealing of the electrochromic device, avoiding the detachment of the sealing adhesive resulting in water and oxygen into the material of the electrochromic device. According to the drop test standard, an interfacial pull-off force of the sealing adhesive relative to the varnish surface should be more than 2.0 N/inch, and preferably, an interfacial pull-off force of the sealing adhesive relative to the varnish surface should be more than 4.0 N/inch.

In the present application, the varnish can exert a sealing effect to a certain extent, and thereby, a moisture permeability of the varnish is less than or equal to 15 $g/m^2/24H$ under the test conditions of 60° C. and 90% RH.

Preferably, the seal includes a structural adhesive layer and a sealing adhesive layer located on the outer side of the structural adhesive layer.

Preferably, a viscosity of the structural adhesive layer is 300-500000 mPa·s.

Preferably, a thixotropic index (TI) is more than or equal to 0.7, such as 0.7, 1.0, 1.5, 1.8, 2.0, 2.2, 2.4, 2.8, 3.0, 3.5, etc.

Preferably, a moisture permeability of the sealing adhesive layer is less than or equal to 15 $g/m^2/24H$ under the test conditions of 60° C. and 90% RH.

In the present application, a material of the sealing adhesive layer includes but not limited to, for example, polyepoxy acrylate, a polyepoxy resin, urethane acrylate, polyether acrylate, polyester acrylate, a polyacrylic resin, etc., and a mixture containing a prepolymer thereof and a reactive diluent. The reactive diluent includes but not limited to, for example, methacrylates, vinyls, and vinyl ethers, etc., wherein the vinyls include but not limited to styrene, and the methacrylates include but not limited to a mixture of butyl acrylate, isooctyl acrylate, isobornyl acrylate, etc.

A material of the structural adhesive layer includes but not limited to, for example, polyepoxy acrylate, a polyepoxy resin, urethane acrylate, polyether acrylate, polyester acrylate, a polyacrylic resin, etc., and a mixture containing a prepolymer thereof and a reactive diluent. The reactive diluent is mainly a polyfunctional compound, such as methacrylates, vinyls, and vinyl ethers, etc., wherein the methacrylates include but not limited to a mixture of tripropylene glycol diacrylate, hexylene glycol diacrylate, trimethylolpropane triacrylate, etc. Meanwhile, the thixotropy of the adhesive is further improved by adding a tackifier such as nano-scale fumed silica and organic bentonite.

Preferably, the first varnish layer and the conductive line on the first conductive layer are arranged side by side with direct contacting, the second varnish layer and the conductive line on the second conductive layer are arranged side by side with direct contacting, the first varnish layer and the second varnish layer are aligned to an edge of the first conductive layer and an edge of the second conductive layer, respectively, and the seal is located between the first varnish layer and the second varnish layer.

Preferably, the first varnish layer and the second varnish layer cover the conductive line on the first conductive layer and the conductive line on the second conductive layer, respectively, the first varnish layer and the second varnish layer are aligned to an edge of the first conductive layer and an edge of the second conductive layer, and the seal is located between the first varnish layer and the second varnish layer.

Furthermore, the bonding force between the adhesive and the first conductive layer or the second conductive layer can be enhanced by increasing their contact area.

Preferably, the first varnish layer and the second varnish layer cover the conductive line on the first conductive layer and the conductive line on the second conductive layer, respectively, gaps are formed between the first varnish layer and an edge of the first conductive layer and between the second varnish layer and an edge of the second conductive layer, respectively, the seal includes a structural adhesive layer and a sealing adhesive layer located on the outer side of the structural adhesive layer, the structural adhesive layer is located between the first varnish layer and the second varnish layer, part of the sealing adhesive layer is located between the first varnish layer and the second varnish layer, and the other part of the sealing adhesive layer is filled in the gaps.

Preferably, the solid color-changing layer includes an ion storage layer, an ion transfer layer and an electrochromic layer stacked in sequence, the ion storage layer contacts with the first conductive layer, the electrochromic layer contacts with the second conductive layer, the first varnish layer and the second varnish layer cover the conductive line on the first conductive layer and the conductive line on the second conductive layer, respectively, the first varnish layer and the second varnish layer are aligned to an edge of the first conductive layer and an edge of the second conductive layer, respectively, the seal includes a structural adhesive layer and a sealing adhesive layer located on the outer side of the structural adhesive layer, the sealing adhesive layer is located between the first varnish layer and the second varnish layer, part of the structural adhesive layer is located between the first varnish layer and the second varnish layer, and the other part of the structural adhesive layer is located at an edge of the ion transfer layer.

In the present application, the ion transfer layer is preferably a solid ion transfer layer.

In the present application, for preparing electrochromic devices with the above structures, the structural adhesive is pre-arranged on edges of the ITO to form an adhesive frame before coating the electrolyte, then the electrolyte is dropped into the adhesive frame, two ITO layers are combined under vacuum, and after the combination, the electrolyte and the adhesive frame is cured. Hence, the structural adhesive needs to have high viscosity and low fluidity to ensure that the adhesive frame maintains its original shape as much as possible after dispensing the structural adhesive until the sealing adhesive is cured; besides, the structural adhesive is also required to have a certain sealing capacity. Therefore, if only sealing adhesive is arranged, the performance requirements of the sealing adhesive will be very demanding. Therefore, two adhesive layers are arranged, in which the structural adhesive has high viscosity and low fluidity for a supporting effect; and the sealing adhesive has a good water and oxygen barrier performance for a sealing effect.

Preferably, at least one of the first substrate layer and the first conductive layer is a transparent structural layer, and at least one of the second conductive layer and the second substrate layer is a transparent structural layer.

Preferably, the first substrate layer, the first conductive layer, the second conductive layer and the second substrate layer are all transparent structural layers.

In the present application, the electrochromic device is prepared exemplarily by the following preparation methods:

(1) forming the transparent conductive layer on the transparent substrate: the transparent conductive layer is formed on the transparent substrate by magnetron sputtering (or vacuum evaporation deposition, sol-gel and chemical vapor deposition method, etc.);

(2) arranging the conductive line and the varnish layer on the transparent conductive layer: the silver line is formed on the transparent conductive layer by screen printing method; and the varnish layer is formed on the transparent conductive layer by screen printing;

(3) coating the electrochromic layer on the transparent conductive layer: 500 mg of poly(3-hexylthiophene) (P3HT) is dissolved in 10 mL of o-xylene and stirred magnetically for 10 h, then the obtained solution is dropped onto the ITO layer (second transparent conductive layer) deposited on the second transparent substrate and spin-coated to form the electrochromic layer;

(4) coating the ion storage layer on the transparent conductive layer: 500 mg of tungsten trioxide is dissolved in 20 mL of deionized water, stirred and filtered, and then the obtained solution is dropped onto the ITO layer (first transparent conductive layer) deposited on the first transparent substrate and spin-coated to form a tungsten trioxide coating to obtain the ion storage layer;

(5) forming the adhesive frame on the periphery side of the ion storage layer: UV-cured structural adhesive is dispensed at the varnish on the ion storage layer to form a ring-shaped adhesive frame;

(6) preparing the entire electrochromic device: 20 wt % by mass of lithium perchlorate, 59.9 wt % by mass of methyl methacrylate, 20% by mass of propylene carbonate and 0.1 wt % by mass of azobisisobutyronitrile are mixed under vacuum and dropped into the region enclosed by the adhesive frame on the ion storage layer; then the above electrochromic material layer (together with the second substrate layer) is covered on the electrolyte coating to form a chamber enclosed by the two substrate layers and the adhesive frame together; when the electrolyte is leveled and fills the entire chamber uniformly under pressure, UV curing is performed, and the electrolyte forms an all-solid ion transfer layer, and at the same time, the structural adhesive forms the structural adhesive layer; and (7) forming the sealing adhesive layer: the adhesive is dispensed on the outer side of the structural adhesive layer and cured to form the sealing adhesive layer.

Compared with the prior art, the present application has the beneficial effects below.

By arranging the varnish layer, the electrochromic device of the present application requires no wiping step for the ion storage layer and/or the electrochromic layer or has reduced wiping difficulty during the preparation process, which greatly reduces the labor cost, avoids the bad products caused by the wiping process, and thus greatly improving the mass production performance of the electrochromic device and the product yield of the electrochromic device; the electrochromic device is further ensured to have good performance.

In the figures, 1-first transparent substrate layer, 2-first transparent conductive layer, 3-ion storage layer, 4-ion transfer layer, 5-electrochromic layer, 6-second transparent conductive layer, 7-second transparent substrate layer, 8-silver line, 9-varnish layer, 91-first varnish layer, 92-second varnish layer, 10-seal, 11-structural adhesive layer, 12-sealing adhesive layer.

DETAILED DESCRIPTION

The technical solutions of the present application are further described below through embodiments. It should be apparent to those skilled in the art that the embodiments are only used for a better understanding of the present application and should not be regard as a specific limitation of the present application.

Embodiment 1

Figure 1:
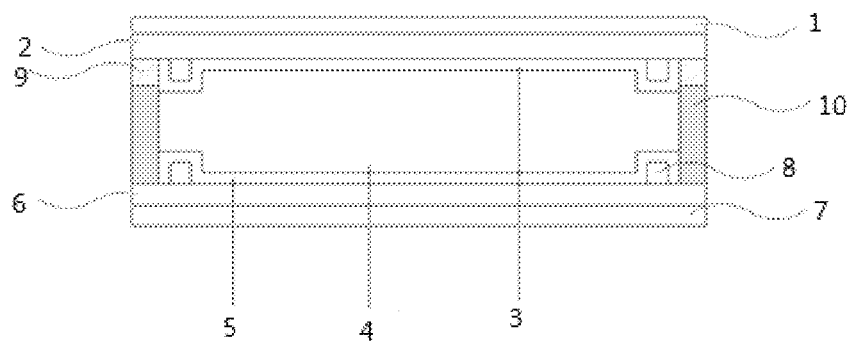
FIG. 1 is a schematic cross-section diagram of an electrochromic device provided in embodiment 1 of the present application.

An electrochromic device is provided in this embodiment. As shown in FIG. 1, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer and the second transparent conductive layer, a varnish layer 9 is arranged at an edge region of the first transparent conductive layer, and a seal 10 is arranged on the periphery side of the electrochromic device. As shown in FIG. 1, the varnish layer 9 and the silver line 8 on the first transparent conductive layer are arranged side by side without contacting, and there exists a gap between the two; the varnish layer 9 is aligned to an edge of the first transparent conductive layer 2; the seal 10 is located between the varnish layer 9 and the second transparent conductive layer 6.

In the electrochromic device provided in this embodiment, a difference obtained by subtracting a surface tension of a slurry of the ion storage layer from a dyne value of the varnish layer is 5 mN/m, and a contact angle θ between the slurry of the ion storage layer and the varnish layer is 30.2°.

The silver lines have a thickness of 10 μm and a width of 20 mm, and the varnish layer has a width of 25 mm and a thickness of 10 μm.

For the electrochromic device in this embodiment, by pre-arranging the varnish layer 9 at the edge of the first transparent conductive layer 2 before coating the ion storage layer, the ion storage layer 3 has a small adhesive force on the varnish surface when being coated on the first conductive layer due to the surface tension. Hence, although the ion storage layer 3 is coated onto the varnish layer 9, the wiping difficulty is significantly reduced compared with the case where no varnish layer is arranged, and the boundary of the wiping region is accurately defined, avoiding the accuracy problem brought by wiping.

In order to illustrate the affection on the coating effect from the difference obtained by subtracting the surface tension of a slurry of the ion storage layer from the dyne value of the varnish layer, different varnish dyne value, EC slurry/CE slurry surface tension and contact angle θ are selected for verification in this embodiment, and the results are shown in Table 1.

tively; the seal 10 is located between the first varnish layer 91 and the second varnish layer 92.

In the electrochromic device provided in this embodiment, a difference obtained by subtracting a surface tension of a slurry of the ion storage layer from a dyne value of the varnish layer is 0 mN/m, and a contact angle θ between the slurry of the ion storage layer and the varnish layer is 40.1°. The silver lines have a thickness of 0.5 μm and a width of 0.01 mm, and the varnish layer has a width of 0.5 mm and a thickness of 1 μm.

For the electrochromic device in this embodiment, by pre-arranging the first varnish layer 91 at the edge of the first transparent conductive layer 2 and pre-arranging the second varnish layer 92 at the edge of the second transparent conductive layer 6 before coating the ion storage layer 3 and the electrochromic layer 5, when the ion storage layer 3 is coated on the first conductive layer and the electrochromic layer 5 is coated on the second conductive layer, due to the surface tension, the edge of the ion storage layer 3 will shrink almost completely on the first varnish layer 91, and the edge of the electrochromic layer 5 will shrink almost

TABLE 1

| Experimental Group | EC Slurry/CE Slurry Surface Tension (mN/m) | Varnish Dyne Value (mN/m) | Contact Angle θ (°) | Coating Effect | Wiping Difficulty |
|---|---|---|---|---|---|
| 1 | 20 | 20 | 41.5 | Without coating | No wiping required |
| 2 | 20 | 25 | 31.8 | With coating partially | Easy to wipe |
| 3 | 20 | 26 | 29.3 | With coating | Hard to wipe |
| 4 | 24 | 24 | 41.1 | Without coating | No wiping required |
| 5 | 24 | 29 | 31.1 | With coating partially | Easy to wipe |
| 6 | 24 | 30 | 29.5 | With coating | Hard to wipe |
| 7 | 26 | 26 | 40.1 | With coating slightly | Easy to wipe |
| 8 | 26 | 31 | 30.8 | With coating partially | Easy to wipe |
| 9 | 26 | 32 | 29.2 | With coating | Hard to wipe |
| 10 | 28 | 24 | 48 | Without coating | No wiping required |
| 11 | 28 | 26 | 44.5 | Without coating | No wiping required |
| 12 | 28 | 28 | 40.3 | With coating slightly | Easy to wipe |
| 13 | 28 | 33 | 30.2 | With coating partially | Easy to wipe |
| 14 | 28 | 34 | 28.4 | With coating | Hard to wipe |
| 15 | 32 | 31 | 42.3 | Without coating | No wiping required |
| 16 | 32 | 37 | 30 | With coating partially | Easy to wipe |
| 17 | 32 | 38 | 27.9 | With coating | Hard to wipe |

Embodiment 2

Figure 2:
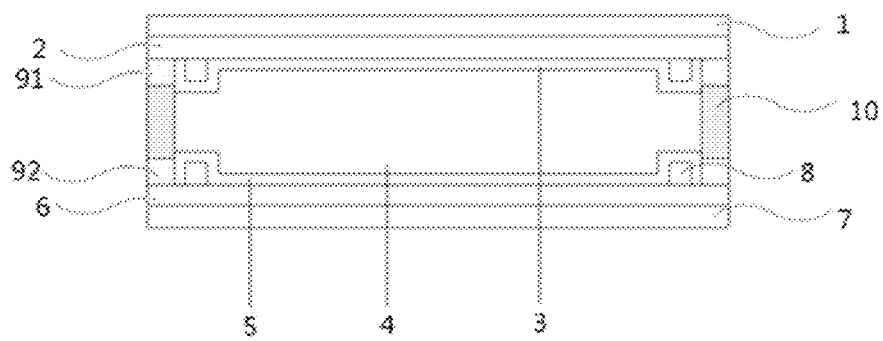
FIG. 2 is a schematic cross-section diagram of an electrochromic device provided in embodiment 2 of the present application.

An electrochromic device is provided in this embodiment. As shown in FIG. 2, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, and a seal 10 is arranged on the periphery side of the electrochromic device. As shown in FIG. 2, the first varnish layer 91 and the silver line 8 on the first transparent conductive layer 2 are arranged side by side without contacting, the second varnish layer 92 and the silver line 8 on the second transparent conductive layer 6 are arranged side by side without contacting, and there exists a gap between the two, respectively; the first varnish layer 91 and the second varnish layer 92 are aligned to an edge of the first transparent conductive layer 2 and an edge of the second transparent conductive layer 6, respeccompletely on the second varnish layer 92, so that the ion storage layer 3 barely covers the first varnish layer 91, and the electrochromic layer 5 barely covers the second varnish layer 92. Hence, the wiping difficulty is reduced, and the boundary of the wiping region is accurately defined, avoiding the accuracy problem brought by wiping.

Embodiment 3

Figure 3:
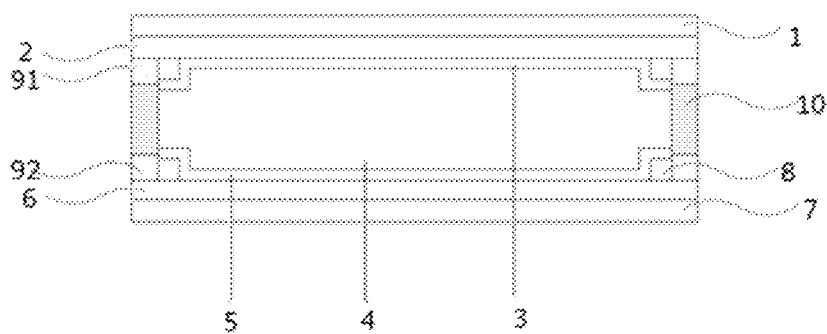
FIG. 3 is a schematic cross-section diagram of an electrochromic device provided in embodiment 3 of the present application.

An electrochromic device is provided in this embodiment. As shown in FIG. 3, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, and a seal 10 is arranged on the periphery side of the electrochromic device. As shown in FIG. 3, the first varnish layer 91 and the silver line 8 on the first transparent conductive layer 2 are arranged side by side with direct contacting, and the second varnish layer 92 and the silver line 8 on the second transparent conductive layer 6 are arranged side by side with direct contacting; the first varnish layer 91 and the second varnish layer 92 are aligned to an edge of the first transparent conductive layer 2 and an edge of the second transparent conductive layer 6, respectively; the seal 10 is located between the first varnish layer 91 and the second varnish layer 92.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 1 μm and a width of 0.5 mm, and the varnish layer has a width of 1 mm and a thickness of 5 μm.

For the electrochromic device in this embodiment, by pre-arranging the first varnish layer 91 at the edge of the first transparent conductive layer 2 and pre-arranging the second varnish layer 92 at the edge of the second transparent conductive layer 6 before coating the ion storage layer 3 and the electrochromic layer 5, when the ion storage layer 3 is coated on the first conductive layer and the electrochromic layer 5 is coated on the second conductive layer, due to the surface tension, the edge of the ion storage layer 3 will shrink from the first varnish layer 91 to the inner boundary of the first varnish layer 91, and the edge of the electrochromic layer 5 will shrink from the second varnish layer 92 to the inner boundary of the second varnish layer 92, so that the ion storage layer 3 will not be coated on the first varnish layer 91, and the electrochromic layer 5 will not be coated on the second varnish layer 92. Hence, the step for wiping the edges of the ion storage layer 3 and the electrochromic layer 5 can be skipped, avoiding a series of problems brought by wiping. Additionally, because the first varnish layer 91 and the silver line 8 on the first transparent conductive layer 2 are arranged side by side with direct contacting, and the second varnish layer 92 and the silver line 8 on the second transparent conductive layer 6 are arranged side by side with direct contacting, the abrupt visual effect, which is caused by the color changing of the gap between the varnish layer and the conductive line, is also avoided.

Embodiment 4

Figure 4:
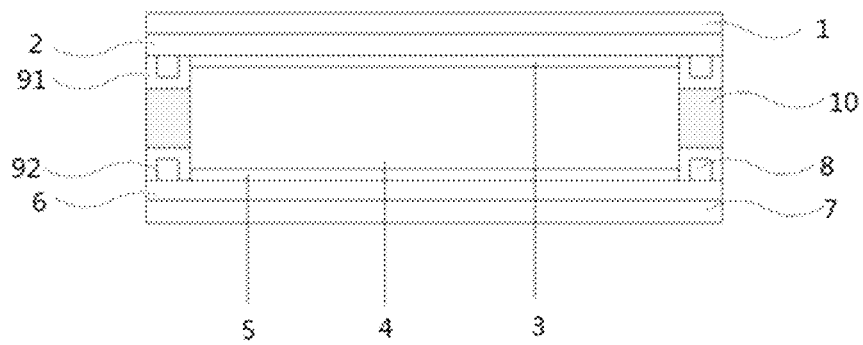
FIG. 4 is a schematic cross-section diagram of an electrochromic device provided in embodiment 4 of the present application.

An electrochromic device is provided in this embodiment. As shown in FIG. 4, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, and a seal 10 is arranged on the periphery side of the electrochromic device. As shown in FIG. 4, the first varnish layer 91 and the second varnish layer 92 cover the conductive line on the first conductive layer and the conductive line on the second conductive layer, respectively; the first varnish layer 91 and the second varnish layer 92 are aligned to an edge of the first conductive layer and an edge of the second conductive layer, respectively; the seal 10 is located between the first varnish layer and the second varnish layer.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 2 μm and a width of 1 mm, and the varnish layer has a width of 3 mm and a thickness of 3 μm.

In the case where the sealing adhesive has the equal width, by arranging the varnish layer on the conductive line, the electrochromic device in this embodiment further has, in addition to the beneficial effects of Embodiment 3, reduced area of the peripheral side of the electrochromic device that cannot change color, or in other words, increased color-changing visible area. Meanwhile, the varnish layer can also protect the conductive line from being oxidized to a certain extent.

Embodiment 5

Figure 5:
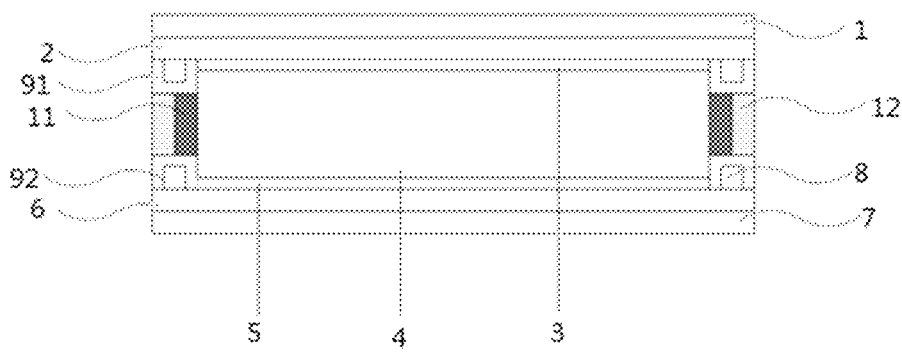
FIG. 5 is a schematic cross-section diagram of an electrochromic device provided in embodiment 5 of the present application.

An electrochromic device is provided in this embodiment. As shown in FIG. 5, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, a seal 10 is arranged on the peripheral side of the electrochromic device, and the seal 10 includes a structural adhesive layer 11 and a sealing adhesive layer 12 located on the outer side of the structural adhesive layer. As shown in FIG. 5, the first varnish layer 91 and the second varnish layer 92 cover the conductive line on the first conductive layer and the conductive line on the second conductive layer, respectively; the first varnish layer 91 and the second varnish layer 92 are aligned to an edge of the first transparent conductive layer 2 and an edge of the second transparent conductive layer 6, respectively; the seal 10 is located between the first varnish layer 91 and the second varnish layer 92.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 2 μm and a width of 1 mm, and the varnish layer has a width of 3 mm and a thickness of 3 μm.

In addition to having the beneficial effects of Embodiment 4, the electrochromic device in this embodiment further improves the process production stability and the sealing effect by arranging the structure of two adhesive layers. The structural adhesive has high viscosity and low fluidity. After coating the ion storage layer 3 and the electrochromic layer 5, the structural adhesive layer 11 formed by the structural adhesive is first arranged on the surface of the first varnish layer 91 or on the surface of the second varnish layer 92, which thereby supports the electrochromic device structurally and limits the electrolyte arrangement range; finally, the sealing adhesive layer 12 is formed on the outer side of the structural adhesive layer 11, and the sealing adhesive has good water and oxygen barrier performance, which can further improve the sealing effect of the electrochromic device, and at the same time can reduce the sealing requirement on structural adhesive, greatly improving the feasibility of the process and saving the cost.

Embodiment 6

Figure 6:
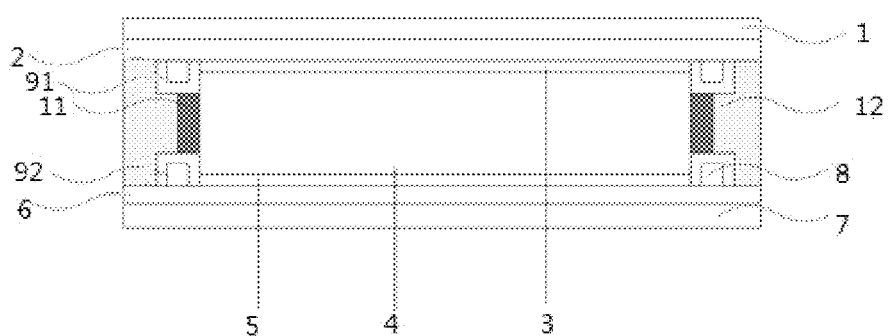
FIG. 6 is a schematic cross-section diagram of an electrochromic device provided in embodiment 6 of the present application.

An electrochromic device is provided in this embodiment. As shown in FIG. 6, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, a seal 10 is arranged on the peripheral side of the electrochromic device, and the seal 10 includes a structural adhesive layer 11 and a sealing adhesive layer 12 located on the outer side of the structural adhesive layer. As shown in FIG. 6, the first varnish layer 91 and the second varnish layer 92 cover the conductive line on the first conductive layer and the conductive line on the second conductive layer, respectively; the first varnish layer 91 and the second varnish layer 92 are aligned to an edge of the first transparent conductive layer 2 and an edge of the second transparent conductive layer 6, respectively; the structural adhesive layer is located between the first varnish layer and the second varnish layer, part of the sealing adhesive layer is located between the first varnish layer and the second varnish layer, and the other part of the sealing adhesive layer is filled in the gap.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 2 μm and a width of 1 mm, and the varnish layer has a width of 3 mm and a thickness of 3 μm.

In addition to having the beneficial effects of Embodiment 5, the electrochromic device in this embodiment has increased contact area of the sealing adhesive layer 12 with the first conductive layer and the second conductive layer by arranging the sealing adhesive layer 12 partly between the first varnish layer 91 and the second varnish layer 92 and partly between the first transparent conductive layer 2 and the second transparent conductive layer 6, which thereby further enhances the sealing effect of the seal on the electrochromic device.

Embodiment 7

Figure 7:
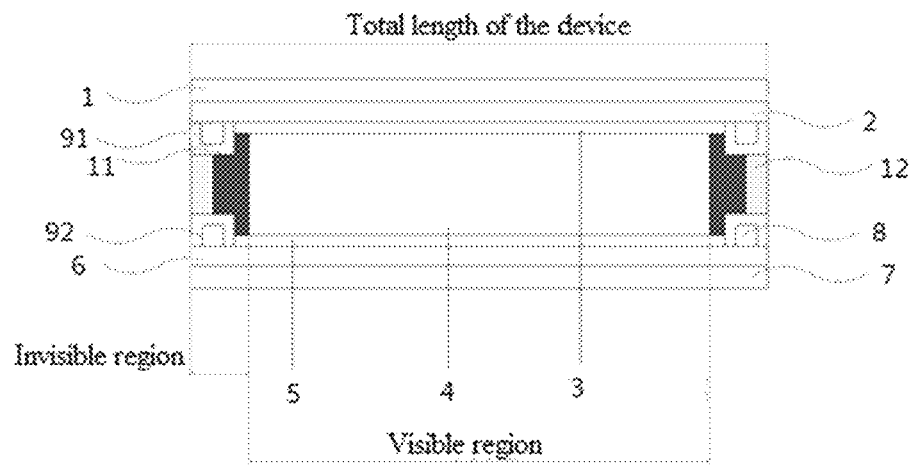
FIG. 7 is a schematic cross-section diagram of an electrochromic device provided in embodiment 7 of the present application.

An electrochromic device is provided in this embodiment. As shown in FIG. 7, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; silver lines 8 are arranged on the first transparent conductive layer 2 and the second transparent conductive layer 6, a first varnish layer 91 and a second varnish layer 92 are arranged at an edge region of the first transparent conductive layer 2 and an edge region of the second transparent conductive layer 6, respectively, a seal 10 is arranged on the peripheral side of the electrochromic device, and the seal 10 includes a structural adhesive layer 11 and a sealing adhesive layer 12 located on the outer side of the structural adhesive layer 11. As shown in FIG. 7, the first varnish layer 91 and the second varnish layer 92 cover the conductive line on the first conductive layer and the conductive line on the second conductive layer, respectively; the first varnish layer 91 and the second varnish layer 92 are aligned to an edge of the first transparent conductive layer 2 and an edge of the second transparent conductive layer 6, respectively; the sealing adhesive layer 12 is located between the first varnish layer 91 and the second varnish layer 92, part of the structural adhesive layer 11 is located between the first varnish layer 91 and the second varnish layer 92, and the other part of the structural adhesive layer 11 is located at an edge of the ion transfer layer 4.

As shown in FIG. 7, along the total length of the device, a region corresponding to the electrochromic layer 5 forms a visible region and a region corresponding to the seal 10 forms an invisible region.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 2 μm and a width of 1 mm, and the varnish layer has a width of 3 mm and a thickness of 3 μm.

In addition to having the beneficial effects of Embodiment 4, the electrochromic device in this embodiment further improves the process production stability and the sealing effect by arranging the structure of two adhesive layers. The structural adhesive has high viscosity and low fluidity. After coating the ion storage layer 3 and the electrochromic layer 5, the structural adhesive layer 11 formed by the structural adhesive is first arranged on the surface of the first varnish layer 91 or on the surface of the second varnish layer 92, which thereby supports the electrochromic device structurally and limits the electrolyte arrangement range; finally, the sealing adhesive layer 12 is formed on the outer side of the structural adhesive layer 11, and the sealing adhesive has good water and oxygen barrier performance, which can further improve the sealing effect of the electrochromic device, and at the same time can reduce the sealing requirement on structural adhesive, greatly improving the feasibility of the process and saving the cost.

Embodiment 8

The difference from Embodiment 1 is that the first transparent substrate layer 1 is replaced with an opaque first substrate layer 1.

Embodiment 9

The difference from Embodiment 1 is that the seal 10 is replaced with a structural adhesive layer 11 at the inner side and a sealing adhesive layer 12 at the outer side.

Embodiment 10

Figure 8:
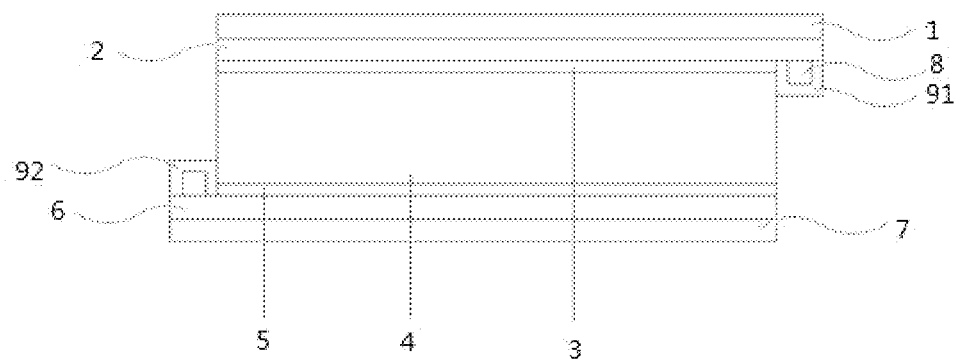
FIG. 8 is a schematic cross-section diagram of an electrochromic device provided in embodiment 10 of the present application.

An electrochromic device is provided in this embodiment. As shown in FIG. 8, the electrochromic device includes a first transparent substrate layer 1, a first transparent conductive layer 2, an ion storage layer 3, an ion transfer layer 4, an electrochromic layer 5, a second transparent conductive layer 6 and a second transparent substrate layer 7 stacked in sequence; a first varnish layer 91 is arranged at an edge region of the first transparent conductive layer 2, and a second varnish layer 92 is arranged at an edge region of the second transparent conductive layer 6.

In the electrochromic device provided in this embodiment, a difference obtained by subtracting a surface tension of a slurry of the ion storage layer from a dyne value of the varnish layer is −2 mN/m, and a contact angle θ between the slurry of the ion storage layer and the varnish layer is 44.5°. The silver lines have a thickness of 2 μm and a width of 1 mm, and the varnish layer has a width of 3 mm and a thickness of 3 μm.

For the electrochromic device in this embodiment, by pre-arranging the first varnish layer 91 at the edge of the first transparent conductive layer 2 and pre-arranging the second varnish layer 92 at the edge of the second transparent conductive layer 6 before coating the ion storage layer 3 and the electrochromic layer 5, when the ion storage layer 3 is coated on the first conductive layer and the electrochromic layer 5 is coated on the second conductive layer, due to the surface tension, the edge of the ion storage layer 3 will shrink from the first varnish layer 91 to the inner boundary of the first varnish layer 91, and the edge of the electrochromic layer 5 will shrink from the second varnish layer 92 to the inner boundary of the second varnish layer 92, so that the ion storage layer 3 will not be coated on the first varnish layer 91, and the electrochromic layer 5 will not be coated on the second varnish layer 92. Hence, the step for wiping the edges of the ion storage layer 3 and the electrochromic layer 5 can be skipped, avoiding a series of problems brought by wiping.

The applicant has stated that although the above embodiments are used to illustrate the process of the present application, the present application is not limited to the above process steps, which means that the present application is not necessarily rely on the above process steps to be implemented. It should be apparent to those skilled in the art that any improvements made to the present application, equivalent replacements of raw materials selected in the present application and addition of adjuvant ingredients thereof, selections of specific methods, etc., all fall within the protection scope and the disclosed scope of the present application.

What is claimed is:

1. An electrochromic device, comprising a first substrate layer, a first conductive layer, a solid color-changing layer, a second conductive layer and a second substrate layer stacked in sequence;
a varnish layer is arranged at an edge region of the first conductive layer and/or at an edge region of the second conductive layer, and a dyne value of the varnish layer minus a surface tension of a slurry of a structure layer in the solid color-changing layer is less than or equal to 5 mN/m, wherein the structure layer contacts with the first conductive layer or the second conductive layer.

2. The electrochromic device according to claim 1, wherein the edge region is a region with a distance from the outer edge of the first conductive layer or the outer edge of the second conductive layer being less than 10 mm.

3. The electrochromic device according to claim 1, wherein a dyne value of the varnish layer minus a surface tension of a slurry of a structure layer in the solid color-changing layer is less than or equal to 0 mN/m, wherein the structure layer contacts with the first conductive layer or the second conductive layer.

4. The electrochromic device according to claim 1, wherein a contact angle θ between a slurry of a structure layer in the solid color-changing layer and the varnish layer is more than or equal to 30°, wherein the structure layer contacts with the first conductive layer or the second conductive layer.

5. The electrochromic device according to claim 1, wherein a contact angle θ between a slurry of a structure layer in the solid color-changing layer and the varnish layer is more than or equal to 40°, wherein the structure layer contacts with the first conductive layer or the second conductive layer.

6. The electrochromic device according to claim 1, wherein conductive lines are arranged on the first conductive layer and the second conductive layer.

7. The electrochromic device according to claim 6, wherein, a width of the varnish layer is more than or equal to a width of the conductive lines, and a thickness of the varnish layer is 1 μm-10 μm.

8. The electrochromic device according to claim 6, wherein, a width of the varnish layer is more than or equal to a width of the conductive lines and less than or equal to 25 mm.

9. The electrochromic device according to claim 1, wherein the solid color-changing layer comprises an ion storage layer, an ion transfer layer and an electrochromic layer stacked in sequence, the ion storage layer contacts with the first conductive layer and the electrochromic layer contacts with the second conductive layer;
and, a first varnish layer and a second varnish layer are arranged at the edge region of the first conductive layer and the edge region of the second conductive layer, respectively, the first varnish layer contacts with the ion storage layer, and the second varnish layer contacts with the electrochromic layer.

10. The electrochromic device according to claim 9, wherein the first varnish layer and the conductive line on the first conductive layer are arranged side by side with direct contacting, the second varnish layer and the conductive line on the second conductive layer are arranged side by side with direct contacting, and the first varnish layer and the second varnish layer are aligned to an edge of the first conductive layer and an edge of the second conductive layer, respectively;
or, the first varnish layer and the second varnish layer cover the conductive line on the first conductive layer and the conductive line on the second conductive layer, respectively, and the first varnish layer and the second varnish layer are aligned to an edge of the first conductive layer and an edge of the second conductive layer, respectively.

11. The electrochromic device according to claim 9, wherein the electrochromic device further comprises a seal arranged on the peripheral side of the electrochromic device.

12. The electrochromic device according to claim 11, wherein, the seal comprises a structural adhesive layer and a sealing adhesive layer located on the outer side of the structural adhesive layer.

13. The electrochromic device according to claim 12, wherein, a viscosity of the structural adhesive layer is 300-500000 mPa·s.

14. The electrochromic device according to claim 12, wherein, a thixotropic index (TI) of the structural adhesive layer is more than or equal to 0.7.

15. The electrochromic device according to claim 12, wherein, a moisture permeability of the sealing adhesive layer is less than or equal to 15 g/m$^2$/24H under the test conditions of 60° C. and 90% RH.

16. The electrochromic device according to claim 12, wherein, an interfacial pull-off force of the sealing adhesive layer relative to the varnish surface is more than 2.0 N/inch.

17. The electrochromic device according to claim 12, wherein, an interfacial pull-off force of the sealing adhesive layer relative to the varnish surface is more than 4.0 N/inch.

18. The electrochromic device according to claim 11, wherein the first varnish layer and the conductive line on the first conductive layer are arranged side by side with direct contacting, the second varnish layer and the conductive line on the second conductive layer are arranged side by side with direct contacting, the first varnish layer and the second varnish layer are aligned to an edge of the first conductive layer and an edge of the second conductive layer, respectively, and the seal is located between the first varnish layer and the second varnish layer;

or, the first varnish layer and the second varnish layer cover the conductive line on the first conductive layer and the conductive line on the second conductive layer, respectively, the first varnish layer and the second varnish layer are aligned to an edge of the first conductive layer and an edge of the second conductive layer, and the seal is located between the first varnish layer and the second varnish layer.

19. The electrochromic device according to claim 11, wherein the first varnish layer and the second varnish layer cover the conductive line on the first conductive layer and the conductive line on the second conductive layer, respectively, gaps are formed between the first varnish layer and an edge of the first conductive layer and between the second varnish layer and an edge of the second conductive layer, respectively, the seal comprises a structural adhesive layer and a sealing adhesive layer located on the outer side of the structural adhesive layer, the structural adhesive layer is located between the first varnish layer and the second varnish layer, part of the sealing adhesive layer is located between the first varnish layer and the second varnish layer, and the other part of the sealing adhesive layer is filled in the gaps;

or, the solid color-changing layer comprises an ion storage layer, an ion transfer layer and an electrochromic layer stacked in sequence, the ion storage layer contacts with the first conductive layer, the electrochromic layer contacts with the second conductive layer, the first varnish layer and the second varnish layer cover the conductive line on the first conductive layer and the conductive line on the second conductive layer, respectively, the first varnish layer and the second varnish layer are aligned to an edge of the first conductive layer and an edge of the second conductive layer, respectively, the seal comprises a structural adhesive layer and a sealing adhesive layer located on the outer side of the structural adhesive layer, the sealing adhesive layer is located between the first varnish layer and the second varnish layer, part of the structural adhesive layer is located between the first varnish layer and the second varnish layer, and the other part of the structural adhesive layer is located at an edge of the ion transfer layer.

20. The electrochromic device according to any one of claim 1, wherein at least one of the first substrate layer and the first conductive layer is a transparent structural layer, and at least one of the second conductive layer and the second substrate layer is a transparent structural layer.

* * * * *